(12) United States Patent
Hsu et al.

(10) Patent No.: US 8,851,459 B2
(45) Date of Patent: Oct. 7, 2014

(54) ELASTIC DEVICE STRUCTURE

(75) Inventors: An Szu Hsu, New Taipei (TW); Yung Sheng Kuo, New Taipei (TW); Sandy Wu, Shenzhen (CN)

(73) Assignee: First Dome Corporation, New Taipei (TW)

( * ) Notice: Subject to any disclaimer, the term of this patent is extended or adjusted under 35 U.S.C. 154(b) by 139 days.

(21) Appl. No.: 13/559,782

(22) Filed: Jul. 27, 2012

(65) Prior Publication Data
US 2013/0285297 A1    Oct. 31, 2013

(30) Foreign Application Priority Data

Apr. 30, 2012 (TW) .............................. 101208132 A

(51) Int. Cl.
*F16F 1/12* (2006.01)
(52) U.S. Cl.
USPC ........... 267/70; 267/174; 267/289; 455/575.4
(58) Field of Classification Search
USPC ........... 267/69, 70, 71, 73, 74, 291, 216, 286, 267/289, 166, 169, 174; 455/90.3, 575.1, 455/575.4
See application file for complete search history.

(56) References Cited

U.S. PATENT DOCUMENTS

| | | | | |
|---|---|---|---|---|
| 2,405,644 A * | 8/1946 | Dath | ............................ | 267/216 |
| 2,581,531 A * | 1/1952 | Haseltine | ..................... | 267/216 |
| 2,581,543 A * | 1/1952 | Lehman | ........................ | 267/216 |
| 7,831,285 B2 * | 11/2010 | Lee | ............................ | 455/575.4 |
| 8,265,720 B2 * | 9/2012 | Ahn et al. | .................. | 455/575.4 |
| 2008/0254844 A1 * | 10/2008 | Lee | ............................ | 455/575.4 |
| 2010/0016043 A1 * | 1/2010 | Kajita et al. | ............... | 455/575.4 |
| 2010/0154168 A1 * | 6/2010 | Ahn et al. | ...................... | 16/277 |

* cited by examiner

*Primary Examiner* — Thomas J Williams
(74) *Attorney, Agent, or Firm* — Rosenberg, Klein & Lee

(57) ABSTRACT

An elastic device structure includes two identical connection seats and multiple elastic members. Each connection seat is defined with a central line and has a protruding connection section and a connected section. The connection section and connected section are symmetrically disposed on two sides of the central line. A laterally protruding lateral hook is disposed on the connection section. The connected section is formed with a receiving channel for receiving the connection section of the other connection seat. A stop raised block is disposed in the receiving channel and positioned at a dead end of slide paths of the lateral hook. Multiple receiving sockets are disposed beside the connection section and connected section. Two end sections of the elastic members respectively extend into the receiving sockets, whereby the two connection seats are elastically slidable relative to each other.

12 Claims, 5 Drawing Sheets

ELASTIC DEVICE STRUCTURE

BACKGROUND OF THE INVENTION

1. Field of the Invention

The present invention relates generally to an improved elastic device structure, and more particularly to an elastic device structure, which has simplified components and is convenient to install and uninstall. Moreover, the elastic device structure can be repeatedly used.

2. Description of the Related Art

FIGS. 1 and 2 show a conventional elastic device applied to two slide members, which are slidable relative to each other. The elastic device includes a first connection seat 6, a second connection seat 7 and multiple elastic members 3. The first connection seat 6 is formed with a pivot hole 61 for pivotally connecting with a slide member and a connection passageway 62. A bearing 611 is disposed in the pivot hole 61 as necessary. At least one slide guide slot 621 with two closed ends is disposed on a wall of the connection passage 62. In addition, multiple receiving sockets 63 are disposed on two sides of the connection passageway 62. A passage 631 passing through the first connection seat 6 is formed in each receiving socket 63. The second connection seat 7 is formed with a pivot hole 71 for pivotally connecting with a relative slide member and a connection protrusion 72. A bearing 711 is disposed in the pivot hole 71 as necessary. At least one slide guide raised block 721 is disposed on the connection protrusion 72. The slide guide raised block 721 is inlaid in the slide guide slot 621. Multiple receiving sockets 73 are disposed on two sides of the connection protrusion 72. A passage 731 passing through the second connection seat 7 is formed in each receiving socket 73. Each elastic member 3 is fitted around a guide rod 31. Two end sections of the guide rod 31 respectively extend into the passages 631, 731 and two end sections of the elastic member 3 respectively abut against bottom walls of the receiving sockets 63, 73. The slide guide raised block 721 is restricted to slide within the slide guide slot 621. By means of the elasticity of the elastic members 3, the first connection seat 6 and the second connection seat 7 are elastically slidable relative to each other without loosening and connected with each other to form the compressible elastic device.

According to the above arrangement, in practice, the conventional elastic device has some shortcomings as follows:

1. The slide guide raised block 721 of the connection protrusion 72 must first pass through the opening of the connection passageway 62 before going into the slide guide slot 621. However, the size of the opening of the connection passageway 62 is adapted to the connection protrusion 72. As a result, it is inconvenient for the connection protrusion 72 with the slide guide raised block 721 to extend into the connection passageway 62.
2. The opening of the connection passageway 62 must be properly larger than the connection protrusion 72 to allow the connection protrusion 72 with the slide guide raised block 721 to pass through the opening. Therefore, after the slide guide raised block 721 is inlaid in the slide guide slot 621, a gap is formed between the connection protrusion 72 and the connection passageway 62. As a result, the connection protrusion 72 is likely to shake and loosen from the connection passageway 62. This will affect the assembling quality.
3. The first and second connection seats 6, 7 are pivotally connected with the slide member and the relative slide member via the pivot pins that are fitted in the close pivot holes 61, 71. It is convenient to assemble the pivot pins with the pivot holes. As a result, the processing cost is increased. Moreover, the pivot pins are generally connected to the slide member and the relative slide member by means of riveting. In case of failure, it is very hard to detach the pivot pins for repair. In the case that the pivot pins are forcedly disassembled, the first and second connection seats 6, 7 and the slide member and the relative slide member are very likely to damage. Under such circumstance, it is impossible to repeatedly use the elastic device as a whole. This fails to meet the principle of economic efficiency.

SUMMARY OF THE INVENTION

It is therefore a primary object of the present invention to provide an improved elastic device structure includes two identical connection seats and multiple elastic members. The connection seats are slidably connected to each other and the elastic members are disposed between the connection seats. Accordingly, the connection seats can be elastically slid toward each other or away from each other. The components of the elastic device are simplified so that the development and manufacturing cost is lowered to increase economic efficiency.

It is a further object of the present invention to provide the above elastic device structure, which can be conveniently installed on two slide members and uninstalled therefrom to shorten assembling time. Moreover, the elastic device structure can be repeatedly used to lower use cost.

To achieve the above and other objects, the elastic device structure of the present invention includes: two connection seats oppositely connected with each other, each connection seat being defined with a central line and having a protruding connection section and a connected section, the connection section and the connected section being symmetrically disposed on two sides of the central line, a lateral hook being disposed on the connection section, the connected section being formed with a receiving channel for receiving the connection section of the other connection seat, a stop raised block being disposed on the receiving channel and positioned at a dead end of slide paths of the lateral hook of the other connection seat; and at least one elastic member connected and disposed between the two connection seats.

In the above elastic device structure, at least one receiving socket is disposed on each connection seat. The receiving sockets of the two connection seats are opposite to each other. Two end sections of the elastic member respectively extend into the receiving sockets of the connection seats and are located therein.

In the above elastic device structure, a passage passing through the connection seat is formed in each receiving socket for receiving a guide rod. The elastic member is fitted on the guide rod.

In the above elastic device structure, a lateral protruding edge is disposed on one side of the connection section, which side is distal from the lateral hook. A stop wall is disposed on the receiving channel of the connected section corresponding to the lateral protruding edge. The stop wall serves to press the lateral protruding edge of the other connection seat.

In the above elastic device structure, the lateral hook is disposed at one end of the connection section, which end is distal from the connection seat and the stop raised block is disposed at one end of the connected section, which end is distal from the connection seat.

In the above elastic device structure, a slide guide slope is formed on one end of the lateral protruding edge, which end is distal from the connection seat.

In the above elastic device structure, each connection seat is formed with a connection notch with a larger interior and a smaller opening.

In the above elastic device structure, a circumference of the connection notch is formed with at least one elastic split.

The present invention can be best understood through the following description and accompanying drawings, wherein:

DETAILED DESCRIPTION OF THE PREFERRED EMBODIMENTS

Figure 1:
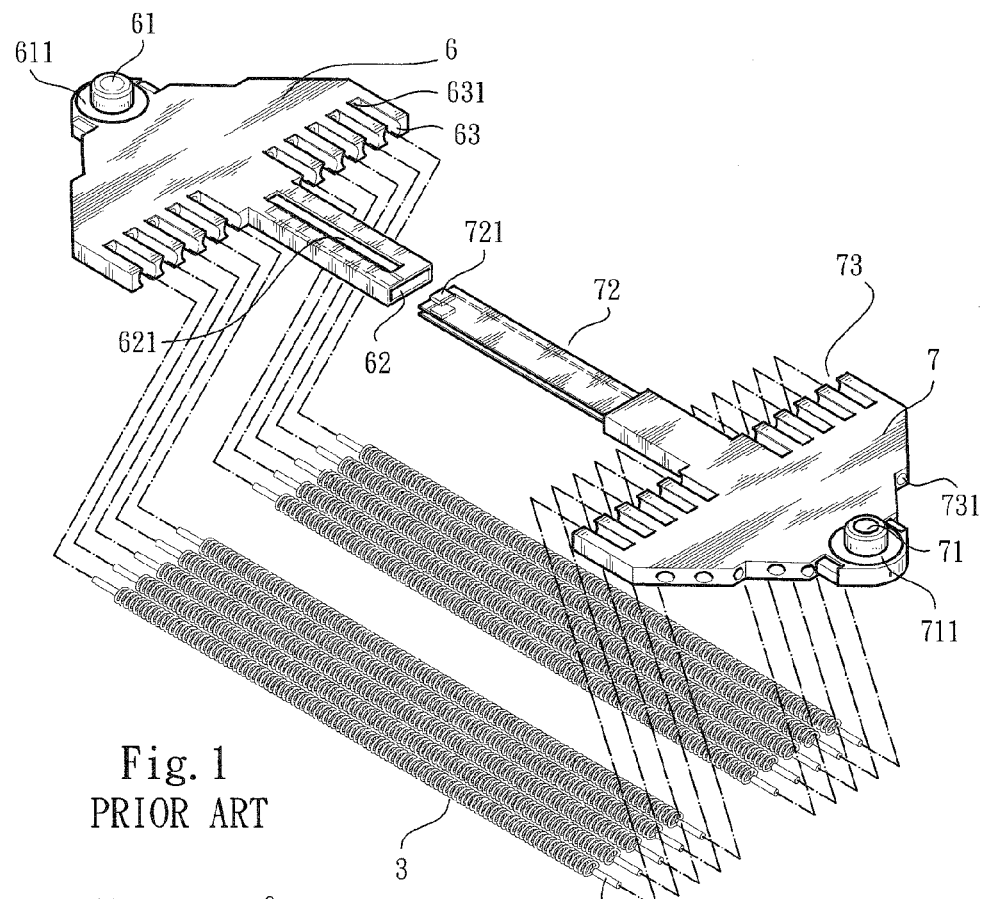
FIG. 1 is a perspective exploded view of a conventional elastic device applied between two slide members.
Figure 2:
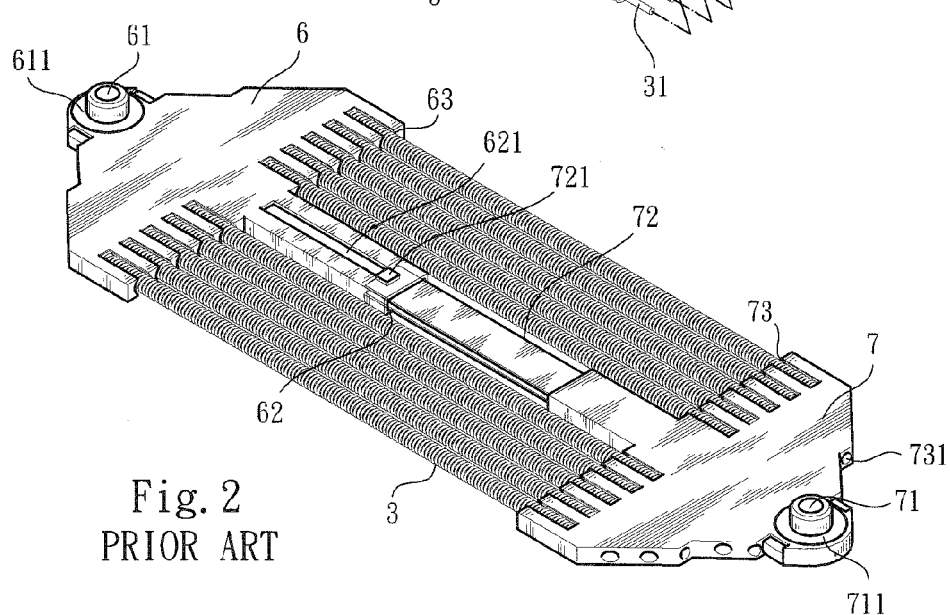
FIG. 2 is a perspective assembled view of the conventional elastic device applied between two slide members.
Figure 3:
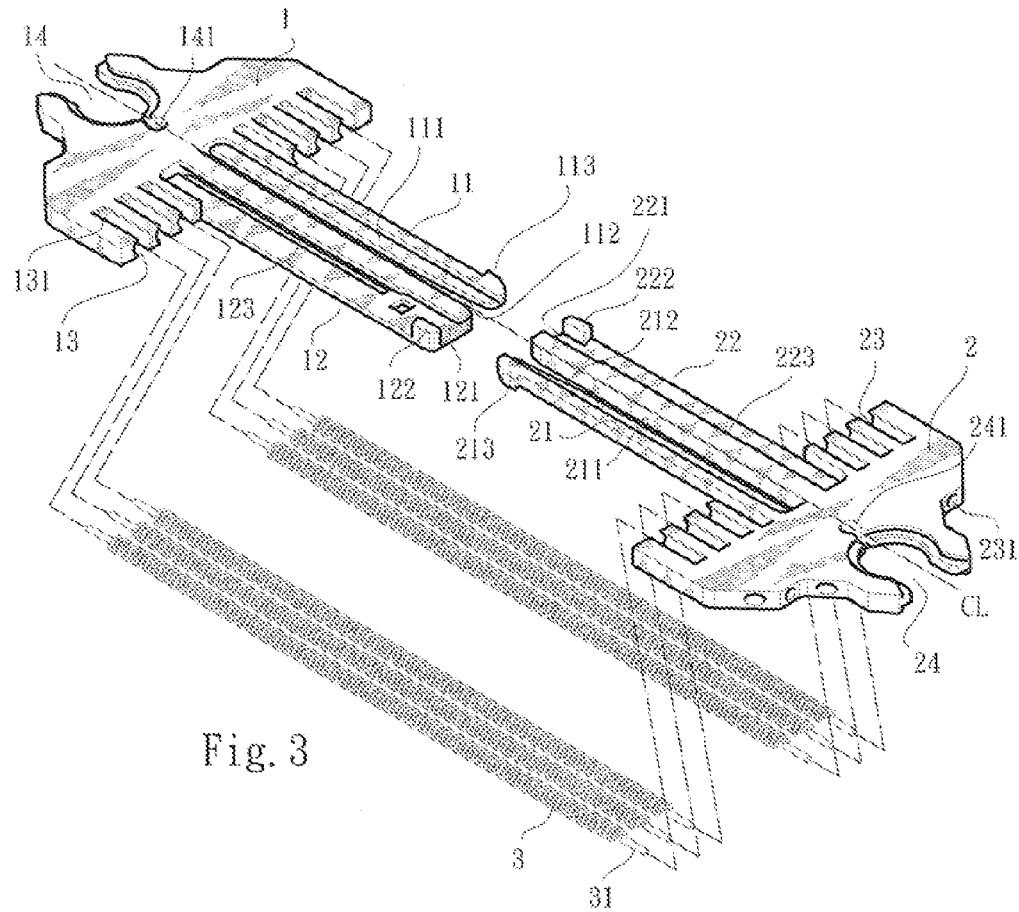
FIG. 3 is a perspective exploded view of the present invention.
Figure 6:
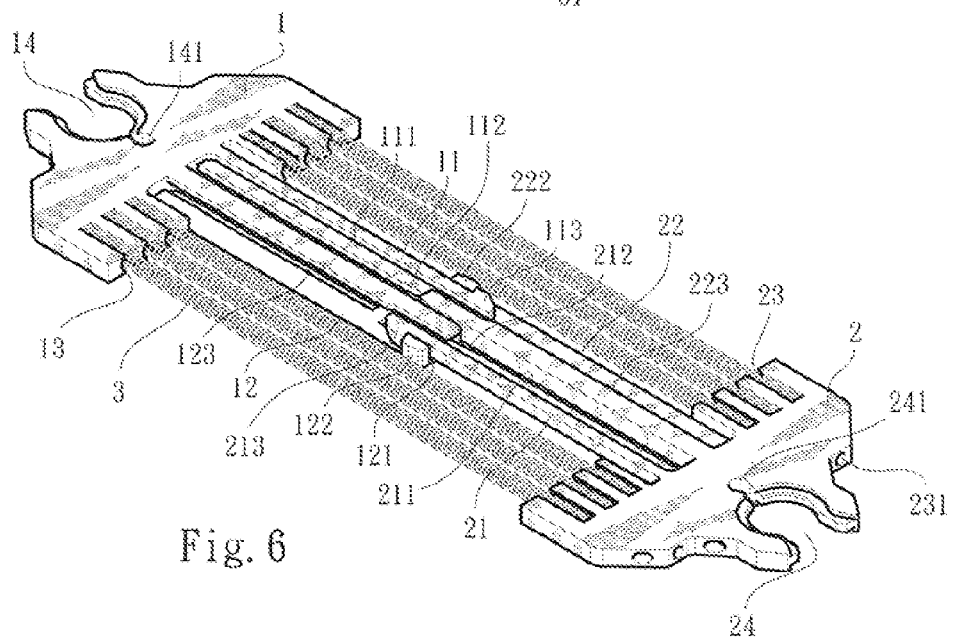
FIG. 6 is a perspective assembled view of the present invention.
Figure 4:
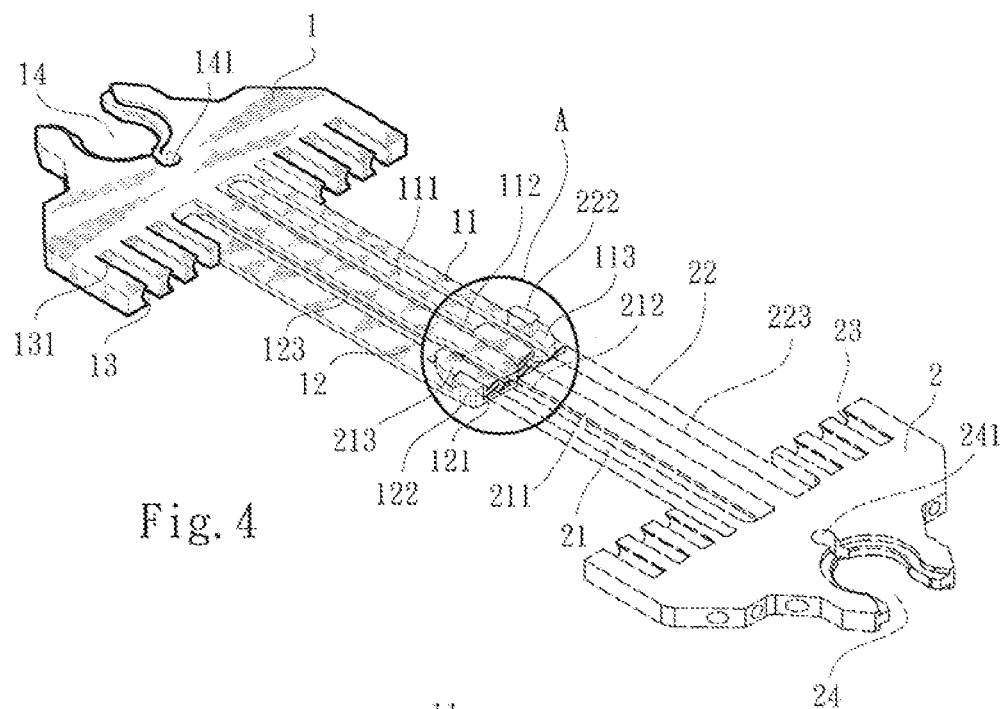
FIG. 4 is a perspective assembled view of the two connection seats of the present invention.
Figure 5:
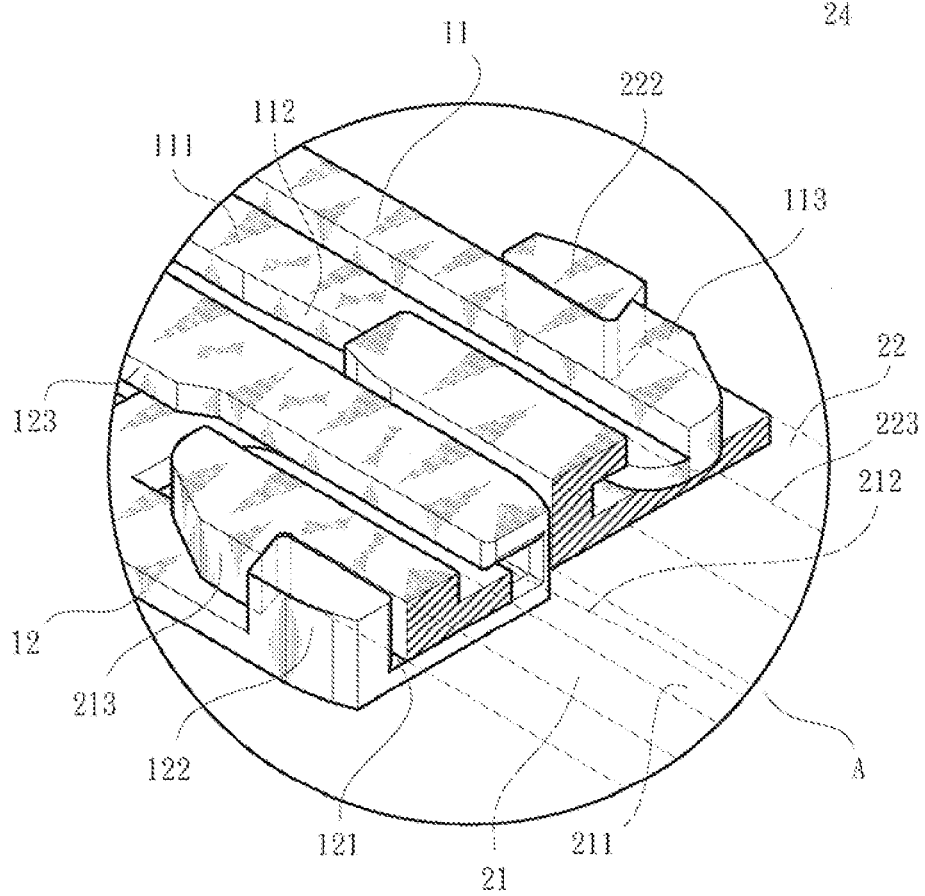
FIG. 5 is an enlarged view of circled area A of FIG. 4.

Please refer to FIGS. 3 to 6. The elastic device structure of the present invention includes two identical connection seats 1, 2 and multiple elastic members 3. Each of the connection seats 1, 2 is formed with a connection notch 14, 24 with a larger interior and a smaller opening. An inner circumference of the connection notch 14, 24 is formed with at least one recessed elastic split 141, 241. In addition, a central line CL is defined at the middle of the connection notch 14, 24 between opposite sides thereof. A connection section 11, 21 and a connected section 12, 22 are symmetrically disposed on two sides of the central line CL. Multiple recessed receiving sockets 13, 23 are disposed on two sides of the connection section 11, 21 and the connected section 12, 22 and arranged in a direction away from the central line CL. A lateral protruding edge 111, 211 is disposed on one side of the connection section 11, 21, which side is proximal to the central line CL. An outer end section of the lateral protruding edge 111, 211, (which end section is distal from the connection seat 1, 2) is formed with a slide guide slope 112, 212. One side of the outer end section of the connection section 11, 21, (which side is distal from the central line CL) is formed with a lateral hook 113, 213 laterally protruding from the outer end section of the connection section 11, 21. The connected section 12, 22 is formed with a receiving channel 121, 221 for receiving the other connection section 11, 21. One side of the receiving channel 121, 221, which side is proximal to the central line CL is formed with a stop wall 123, 223 for partially concealing the receiving channel 121, 221. A stop raised block 122, 222 is disposed on one side of the outer end section (distal from the connection seat 1, 2) of the receiving channel 121, 221, which side is distal from the central line CL. A passage 131, 231 passing through the connection seat 1, 2 is formed in each receiving socket 13, 23. The elastic member 3 can be a spring. A guide rod 31 is fitted in and through the elastic member 3.

When assembled, the connection sections 11, 21 of the two connection seats 1, 2 are oppositely extended into the receiving channels 221, 121 of the connected sections 22, 12 of the other connection seats 2, 1. The slide guide slopes 112, 212 narrow the cross sections of the end sections of the connection sections 11, 21 to be smaller than the width of the receiving channels 221, 121. Accordingly, when the lateral hooks 113, 213 pass through the stop raised blocks 222, 122, the lateral hooks 113, 213 will be transversely biased away from the stop raised blocks 222, 122 within the receiving channels 221, 121. Accordingly, the insertion is facilitated. After inserted, the stop walls 123, 223 respectively press the lateral protruding edges 211, 111 of the connection sections 21, 11. Accordingly, the connection sections 11, 21 are securely inlaid in the receiving channels 121, 221 of the connected sections 12, 22 and smoothly relatively slidable within the receiving channels 121, 221 without loosening. In addition, the stop raised blocks 122, 222 are positioned at the dead ends of the slide paths of the lateral hooks 213, 113 to stop the lateral hooks 213, 113, whereby the connection sections 11, 21 are prevented from detaching from the connected sections 12, 22. Two end sections of the elastic members 3 respectively abut against bottom walls of the receiving sockets 131, 231 of the connection seats 1, 2. Two end sections of the guide rods 31 are respectively extended into the passages 131, 231 and located.

Figure 7:
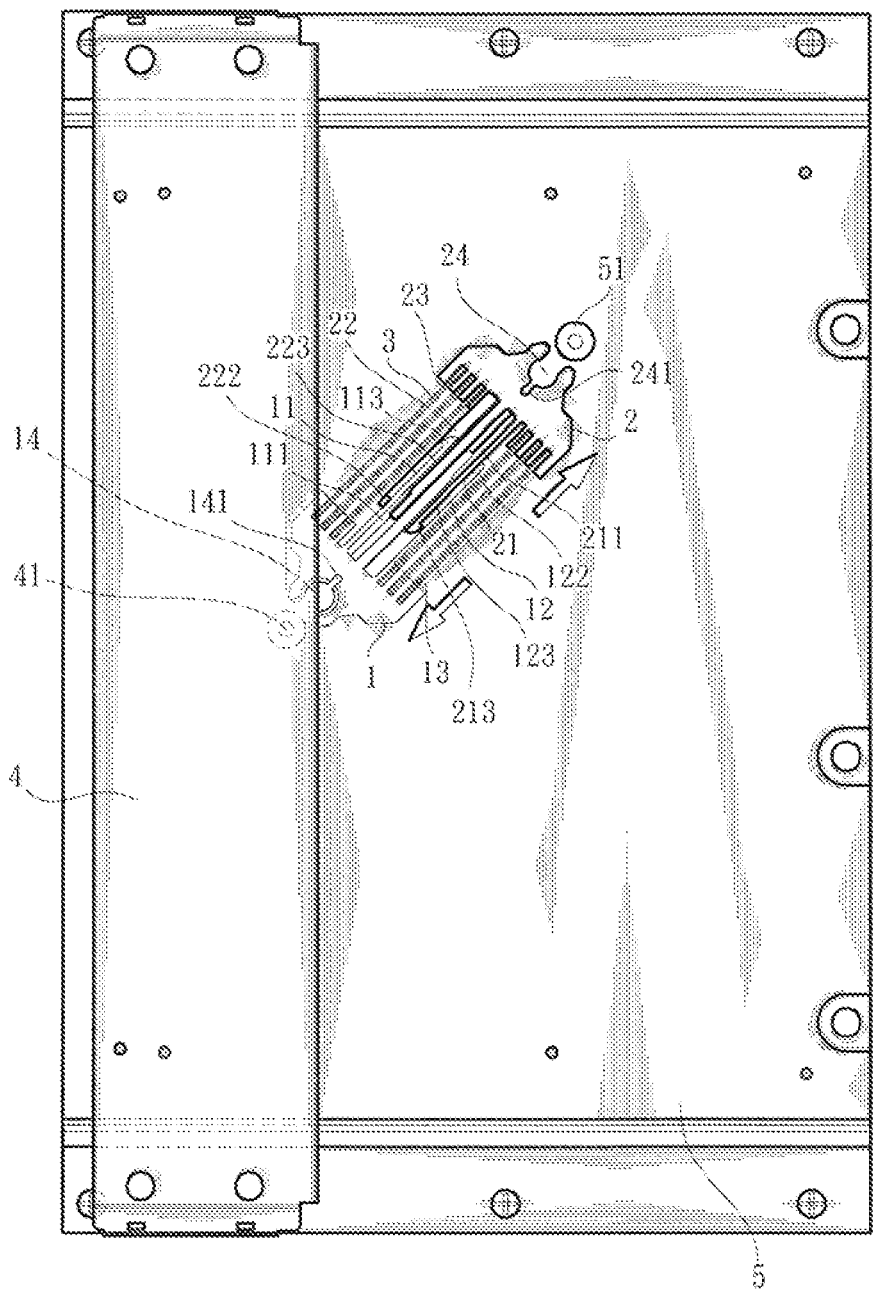
FIG. 7 is a plane view showing the operation of the present invention connected between two slide member.
Figure 8:
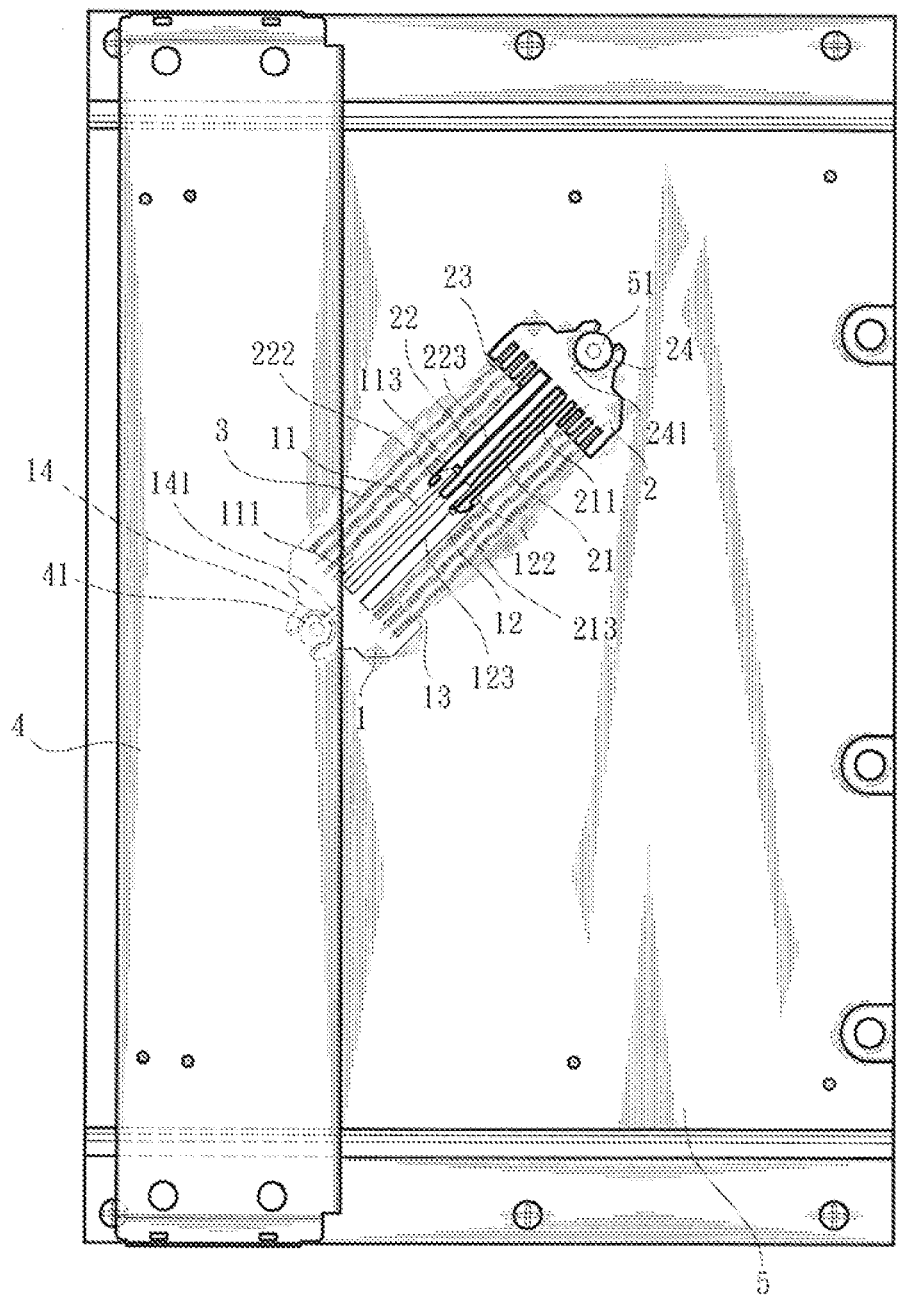
FIG. 8 is another plane view showing the operation of the present invention connected between two slide members.

Please now refer to FIGS. 7 and 8. In practice, the elastic device 3 composed of the connection seats 1, 2 and the multiple elastic members 3 is mounted on a slide member 4 and a relative slide member 5, which are slidable relative to each other. Two pivot pins 41, 51 are previously respectively disposed on the slide member 4 and the relative slide member 5. Then the two connection seats 1, 2 are forced toward each other to compress the elastic members 3. Then, the connection notches 14, 24 of the connection seats 1, 2 are fitted on the pivot pins 41, 51. (The elastic splits 141, 241 permit the connection notches 14, 24 to elastically expand to facilitate fitting of the pivot pins 41, 51). Accordingly, the slide member 4 and the relative slide member 5 can be elastically connected with the elastic members 3 via the connection seats 1, 2.

In conclusion, the elastic device structure has simplified components and can be easily installed and uninstalled. Moreover, the cost for the elastic device structure is lower.

The above embodiment is only used to illustrate the present invention, not intended to limit the scope thereof. Many modifications of the above embodiment can be made without departing from the spirit of the present invention.

What is claimed is:

1. An elastic device structure comprising:

two connection seats oppositely connected with each other, each connection seat being defined with a central line and having a protruding connection section and a connected section, the connection section and the connected section being symmetrically disposed on two sides of the central line, a lateral hook being disposed on the connection section, the connected section being formed with a receiving channel for receiving the connection section of the other connection seat, a stop raised block being disposed on the receiving channel and positioned at a dead end of slide paths of the lateral hook of the other connection seat; and at least one elastic member connected and disposed between the two connection seats;

wherein a lateral protruding edge is disposed on one side of the connection section, which side is distal from the lateral hook, a stop wall being disposed on the receiving channel of the connected section corresponding to the lateral protruding edge, the stop wall serving to press the lateral protruding edge of the other connection seat; and wherein a slide guide slope is formed on one end of the lateral protruding edge, which end is distal from the connection seat.

2. The elastic device structure as claimed in claim 1, wherein at least one receiving socket is disposed on each connection seat, the receiving sockets of the two connection seats being opposite to each other, two end sections of the elastic member respectively extending into the receiving sockets of the connection seats and being located therein.

3. The elastic device structure as claimed in claim 2, wherein a passage passing through the connection seat is formed in each receiving socket for receiving a guide rod, the elastic member being fitted on the guide rod.

4. The elastic device structure as claimed in claim 3, wherein the lateral hook is disposed at one end of the connection section, which end is distal from the connection seat and the stop raised block is disposed at one end of the connected section, which end is distal from the connection seat.

5. The elastic device structure as claimed in claim 3, wherein each connection seat is formed with a connection notch with a larger interior and a smaller opening.

6. The elastic device structure as claimed in claim 2, wherein each connection seat is formed with a connection notch with a larger interior and a smaller opening.

7. The elastic device structure as claimed in claim 1, wherein the lateral hook is disposed at one end of the connection section, which end is distal from the connection seat and the stop raised block is disposed at one end of the connected section, which end is distal from the connection seat.

8. The elastic device structure as claimed in claim 2, wherein the lateral hook is disposed at one end of the connection section, which end is distal from the connection seat and the stop raised block is disposed at one end of the connected section, which end is distal from the connection seat.

9. The elastic device structure as claimed in claim 7, wherein each connection seat is formed with a connection notch with a larger interior and a smaller opening.

10. The elastic device structure as claimed in claim 9, wherein a circumference of the connection notch is formed with at least one recessed elastic split.

11. The elastic device structure as claimed in claim 1, wherein each connection seat is formed with a connection notch with a larger interior and a smaller opening.

12. The elastic device structure as claimed in claim 11, wherein a circumference of the connection notch is formed with at least one recessed elastic split.

* * * * *